US012219236B2

(12) United States Patent
Song (10) Patent No.: US 12,219,236 B2
(45) Date of Patent: Feb. 4, 2025

(54) DRIVE APPARATUS, CAMERA MODULE, AND ELECTRONIC DEVICE (71) Applicant: VIVO MOBILE COMMUNICATION CO., LTD., Guangdong (CN)

(72) Inventor: Bo Song, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 160 days.

(21) Appl. No.: 18/076,521

(22) Filed: Dec. 7, 2022

(65) Prior Publication Data
US 2023/0100984 A1 Mar. 30, 2023

Related U.S. Application Data (63) Continuation of application No. PCT/CN2021/099349, filed on Jun. 10, 2021.

(30) Foreign Application Priority Data

Jun. 12, 2020 (CN) .................. 202010536062.X (51) Int. Cl.
H04N 23/57 (2023.01)
G02B 7/08 (2021.01)
H04N 23/54 (2023.01)
H04N 23/55 (2023.01)
H04N 23/60 (2023.01)

(52) U.S. Cl.
CPC .............. H04N 23/57 (2023.01); G02B 7/08 (2013.01); H04N 23/54 (2023.01); H04N 23/55 (2023.01); H04N 23/60 (2023.01)

(58) Field of Classification Search
CPC ........ H04N 23/57; H04N 23/54; H04N 23/60; H04N 23/55; G02B 7/08
USPC .......................................................... 348/374
See application file for complete search history.

(56) References Cited

U.S. PATENT DOCUMENTS

| | | | |
|---|---|---|---|
| 2007/0285558 A1 | 12/2007 | Oohara et al. | |
| 2008/0165427 A1 | 7/2008 | Tseng et al. | |
| 2011/0236009 A1* | 9/2011 | Murakami | G03B 3/10 396/133 |
| 2012/0249868 A1 | 10/2012 | Kamatani et al. | |
| 2017/0059812 A1* | 3/2017 | Kyung | G02F 1/00 |
| 2020/0174274 A1 | 6/2020 | Wang et al. | |

FOREIGN PATENT DOCUMENTS

| | | |
|---|---|---|
| CN | 103472563 A | 12/2013 |
| CN | 204256341 U | 4/2015 |
| CN | 107079090 A | 8/2017 |
| CN | 110913099 A | 3/2020 |
| EP | 2413172 A1 | 2/2012 |
| EP | 3078703 A1 | 10/2016 |

(Continued)

Primary Examiner — Joel W Fosselman
(74) Attorney, Agent, or Firm — Price Heneveld LLP (57) ABSTRACT A drive apparatus, a camera module, and an electric device are provided. A fixed assembly, a carrier, and an electrically drive assembly are included. A first end of the electrically drive assembly is connected to the fixed assembly, and a second end of the electrically drive assembly is connected to the carrier; and the carrier is used for carrying a function device; where in a case of applying a voltage to the electrically drive assembly, the electrically drive assembly deforms to drive the carrier to move.

15 Claims, 4 Drawing Sheets (56) References Cited

FOREIGN PATENT DOCUMENTS

| | | | |
|---|---|---|---|
| JP | 2006010892 | A | 1/2006 |
| JP | 2007094237 | A | 4/2007 |
| JP | 2009223117 | A | 10/2009 |
| JP | 2011203435 | A | 10/2011 |
| KR | 20100019688 | A | 2/2010 |

* cited by examiner

DRIVE APPARATUS, CAMERA MODULE, AND ELECTRONIC DEVICE

CROSS-REFERENCE TO RELATED APPLICATIONS

This application is a continuation application of International Application No. PCT/CN2021/099349 filed on Jun. 10, 2021, which claims priority to Chinese Patent Application No. 202010536062.X filed on Jun. 12, 2020, which are incorporated herein by reference in their entireties.

TECHNICAL FIELD

This application relates to the field of electronic devices, and in particular, to a drive apparatus, a camera module, and an electronic device.

BACKGROUND

At present, with the development of electronic devices, people often photograph images through the electronic devices. With the improvement of demands of people, the quality requirements of images are also higher and higher.

A drive structure in a camera module of the electronic device can drive a lens to move to realize an automatic focusing function, so as to photograph a clearer image.

A conventional drive apparatus uses a magnetoelectric structure to implement the driving of the drive apparatus; however, the magnetoelectric structure would interfere with the electronic devices around the drive apparatus and affect performances of the electronic devices.

SUMMARY

An embodiment of this application provides a drive apparatus, a camera module, and an electronic device to solve the current problem that a magnetic field generated by a magnetic steel and coil of the drive apparatus would interfere devices around the drive apparatus.

In order to resolve the technical problems above, embodiments of this application is implemented as follows:

A first aspect of an embodiment of this application provides a drive apparatus, including a fixed assembly, a carrier, and an electrically drive assembly;

where a first end of the electrically drive assembly is connected to the fixed assembly, and a second end of the electrically drive assembly is connected to the carrier; and the carrier is used for carrying a function device; and where in a case of applying a voltage to the electrically drive assembly, the electrically drive assembly deforms to drive the carrier to move.

Furthermore, the electrically drive assembly includes electrically drive pieces, first ends of the electrically drive pieces are connected to the fixed assembly, and second ends of the electrically drive pieces are connected to the carrier.

Furthermore, the fixed assembly includes an annular structure member with a first through hole, the carrier is disposed in the first through hole, there are a plurality of electrically drive pieces, and the plurality of electrically drive pieces are symmetrically disposed with respect to a central axis of the first through hole.

Furthermore, the carrier includes a second through hole, the second through hole forms an accommodating cavity, and the function device is disposed in the accommodating cavity; and in a case of applying a voltage to the electrically drive piece, the electrically drive piece deforms and drives the carrier to move along an axial direction of the second through hole.

Furthermore, the drive apparatus includes a housing, the annular structure member is fixedly disposed at the housing, the fixed assembly further includes a fixed member, the fixed member is disposed at an inner wall of the first through hole, and the number of the fixed members is the same as the number of the electrically drive pieces, and each of the electrically drive pieces is connected to the annular structure member through one of the fixed members.

Furthermore, the electrically drive piece is an ion conduction drive piece, the ion conduction drive piece includes an ion exchange resin layer and a first electrode layer and a second electrode layer respectively disposed at two opposite surfaces of the ion exchange resin layer, and a polymer electrolyte is disposed in the ion exchange resin layer.

Furthermore, a voltage applied to the ion conduction drive piece is a first voltage, the ion conduction drive piece drives the carrier to move along a first direction;

in a case that a voltage applied to the ion conduction drive piece is a second voltage, the ion conduction drive piece drives the carrier to move along a second direction;

where polarities of the first voltage and the second voltage are opposite, and the first direction and the second direction are opposite to each other.

Furthermore, a voltage applied to the ion conduction drive piece is a first voltage, the ion conduction drive piece drives the carrier to move along a first direction by a first distance; and in a case that a voltage applied to the ion conduction drive piece is a third voltage, the ion conduction drive piece drives the carrier to move along the first direction by a second direction; and where polarities of the first voltage and the third voltage are the same, the third voltage is greater than the first voltage, and the first distance is different from the second distance.

Furthermore, a voltage applied to the ion conduction drive piece is a first voltage, the ion conduction drive piece drives the carrier to move along a first direction at a first speed;

in a case that a voltage applied to the ion conduction drive piece is a third voltage, the ion conduction drive piece drives the carrier to move along the first direction at a second speed; and where polarities of the first voltage and the third voltage are the same, the third voltage is greater than the first voltage, and the first speed is different from the second speed.

A second aspect of an embodiment of this application provides a camera module, including a first drive apparatus, the first drive apparatus being the drive apparatus of any one above.

Furthermore, a function device carried by a carrier in the first drive apparatus A is a first lens or a first lens group, the camera module further includes a second drive apparatus A, the second drive apparatus A is the drive apparatus of any one above, and a function device carried by a carrier in the second drive apparatus A is a second lens or a second lens group.

A third aspect of an embodiment of this application provides an electronic device, including the drive apparatus of any one above.

In embodiments of this application, a fixed assembly, a carrier, and an electrically drive assembly are included. A first end of the electrically drive assembly is connected to the fixed assembly, and a second end of the electrically drive assembly is connected to the carrier; and the carrier is used for carrying a function device; where in a case of applying a voltage to the electrically drive assembly, the electrically drive assembly deforms to drive the carrier to move. In the structure of the drive apparatus above, the magnetoelectric structure is canceled, which would not interfere the magnetic field generated by the circuits and devices around the drive apparatus, and working environments of circuits and devices around the drive apparatus are purified.

DETAILED DESCRIPTION

The following clearly and completely describes the technical solutions in the embodiments of this application with reference to the accompanying drawings in the embodiments of this application. Apparently, the described embodiments are some rather than all of the embodiments of this application. All other embodiments obtained by a person skilled in the art based on the embodiments of this application without creative efforts shall fall within the protection scope of this application.

Figure 1:
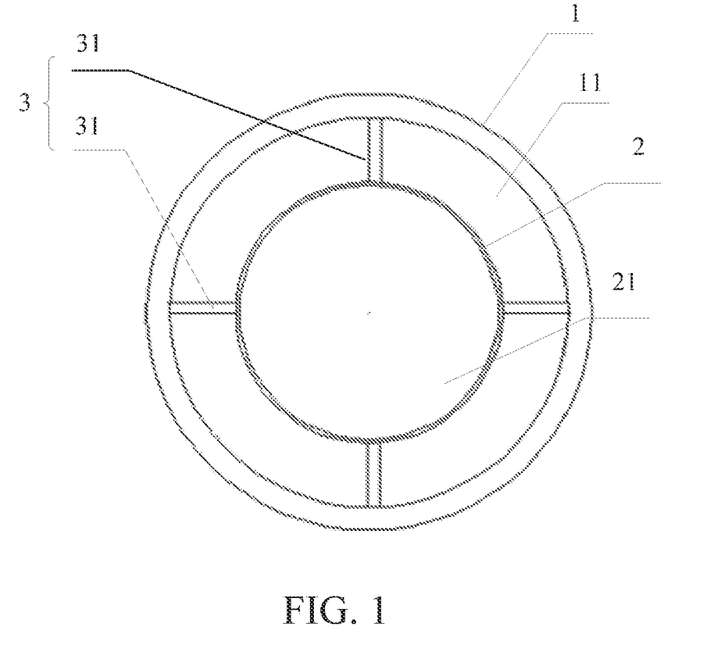
FIG. 1 is a schematic structural diagram of a drive apparatus provided by an embodiment of this application.
Figure 2:
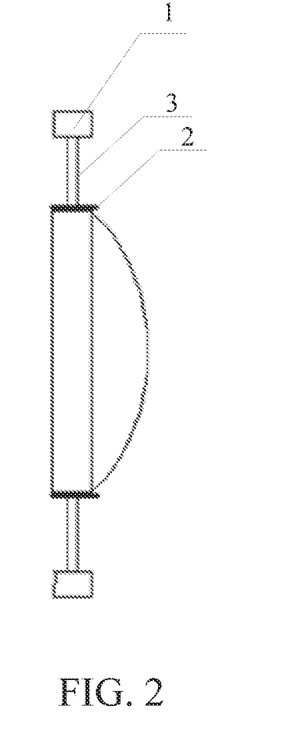
FIG. 2 is a side view of the structural diagram of FIG. 1.

Referring to FIG. 1 and FIG. 2, this embodiment provides a drive apparatus, which includes: a fixed assembly 1, a carrier 2, and an electrically drive assembly 3. A first end of the electrically drive assembly 3 is connected to the fixed assembly 1, and a second end of the electrically drive assembly 3 is connected to the carrier 2; and the carrier 2 is used for carrying a function device; where in a case of applying a voltage to the electrically drive assembly 3, the electrically drive assembly 3 deforms to drive the carrier 2 to move.

The fixed assembly 1 and the electrically drive assembly 3 can be fixedly connected or detachably connected; similarly, the carrier 2 and the electrically drive assembly 3 can be fixedly connected or detachably connected. The carrier 2 is used for carrying the function device; the carrier 2 can be detachably connected to the function device, for example, threaded connection or clamping, and the function device may be an optical device.

For example, the optical device can be a lens or lens assembly applied to a camera, an infrared sensor, a flashlight, and other devices; through the drive apparatus, optical parameters such as optical path lengths of optical signals output or received by an optical device and divergence angle and focus of the optical device can be adjusted. The function device can also be an acoustic module. A position of the acoustic module can be adjusted by the drive apparatus, so as to change the volume of a front cavity or a rear cavity of the acoustic module, so as to change audio characteristics of the acoustic module and so on. The function device can also be some other active devices, such as styluses, interfaces, card holders, or other structures. In this case, the drive apparatus is a drive structure that the active device ejects.

When a voltage is applied to the electrically drive assembly 3, the electrically drive assembly 3 deforms and drives the carrier 2 to move. For example, according to different deformation directions of the electrically drive assembly 3, the carrier 2 can be driven to move towards a first direction or a second direction, and the first direction and the second direction are opposite to each other.

The drive apparatus provided in this embodiment includes: a fixed assembly 1, a carrier 2, and an electrically drive assembly 3. A first end of the electrically drive assembly 3 is connected to the fixed assembly 1, and a second end of the electrically drive assembly 3 is connected to the carrier 2; and the carrier 2 is used for carrying a function device; where in a case of applying a voltage to the electrically drive assembly 3, the electrically drive assembly 3 deforms to drive the carrier 2 to move. In the structure of the drive apparatus above, the magnetoelectric structure is canceled, which would not interfere the magnetic field generated by the circuits and devices around the drive apparatus, and working environments of circuits and devices around the drive apparatus are purified.

As shown in FIG. 1, the electrically drive assembly 3 includes electrically drive pieces 31, first ends of the electrically drive pieces 31 are connected to the fixed assembly 1, and second ends of the electrically drive pieces 31 are connected to the carrier 2.

In an embodiment of this application, the fixed assembly 1 includes an annular structure member with a first through hole 11, the carrier 2 is disposed in the first through hole 11, there are a plurality of electrically drive pieces 31, and the plurality of electrically drive pieces 31 are symmetrically disposed with respect to a central axis of the first through hole 11.

Specifically, there are a plurality of electrically drive pieces 31; the plurality of electrically drive pieces 31 are symmetrically disposed with respect to the central axis of the first through hole 11, so that a drive force acting on the carrier 2 can be equally distributed. Preferably, the number of the electrically drive pieces 31 is four.

Furthermore, the carrier 2 includes a second through hole 21; the second through hole 21 forms an accommodating cavity; the function device is disposed in the accommodating cavity; in a case of applying a voltage to the electrically drive piece 31, the electrically drive piece 31 deforms and drives the carrier 2 to move along an axial direction of the second through hole 21. The movement of the carrier 2 drives the function device to move together.

In an embodiment of this application, the drive apparatus includes a housing, the annular structure member is fixedly disposed at the housing, the fixed assembly 1 further includes a fixed member, the fixed member is disposed at an inner wall of the first through hole 11, and the number of the fixed members is the same as the number of the electrically drive pieces 31, and each of the electrically drive pieces 31 is connected to the annular structure member through one of the fixed members.

The fixed member can be connected to the electrically drive piece 31 by welding or glue adhesion; the fixed member may include an upper gasket and a lower gasket, and the upper gasket and the lower gasket are respectively in contact with a first surface and a second surface of the electrically drive piece 31. The drive apparatus further includes a circuit board; the circuit board may be disposed at a gap between the housing and the annular structure member; the fixed member is electrically connected to the circuit board. In a case that the fixed member is electrically conducted with the circuit board, polarity of voltages applied to the upper gasket and the lower gasket is opposite, so that polarity of voltages applied to the first surface and the second surface of the electrically drive piece 31 is opposite, so as to deform the electrically drive piece 31 to drive the carrier 2 to move.

In an embodiment of this application, the drive apparatus further includes a support disposed on the carrier 2; the electrically drive piece 31 can be connected to the carrier 2 through the support. The support can be made of an insulation material with a low cost, to save the use amount of electrically vibration pieces, so as to lower the cost of the drive apparatus.

In an embodiment of this application, the electrically drive piece 31 is an ion conduction drive piece, the ion conduction drive piece includes an ion exchange resin layer and a first electrode layer and a second electrode layer respectively disposed at two opposite surfaces of the ion exchange resin layer, and a polymer electrolyte is disposed in the ion exchange resin layer.

Figure 3:
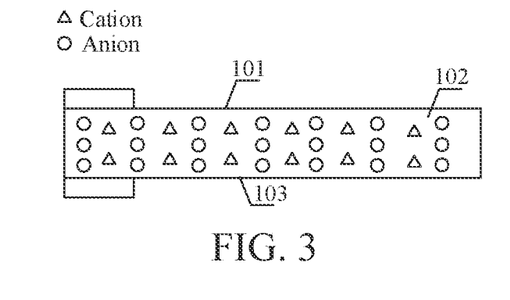
FIG. 3 is a schematic diagram of an electrically drive piece made by using IPMC provided in an embodiment of this invention without applying a voltage.

Specifically, the electrically drive piece 4 may be made of an ion-exchange polymer metal composite (ion-exchange polymer metal composite, IPMC). An IPMC material is a novel electrically actuated function material, where an ion exchange resin layer (such as a fluorocarbon polymer) is used as a matrix, and a precious metal (such as platinum and silver) is coated on a surface of the matrix to form electrode layers, that is, a first electrode layer and a second electrode layer. As shown in FIG. 3, the reference numeral 101 and reference numeral 103 in FIG. 3 respectively refer to the first electrode layer and the second electrode layer. The ion exchange resin layer 102 includes a polymer electrolyte; the polymer electrolyte includes cations and anions. Positions and number of the cations and anions in FIG. 3 are only exemplary, and do not represent actual conditions.

Figure 4:
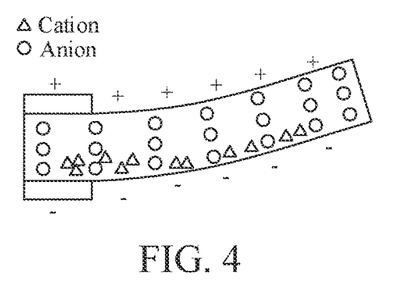
FIG. 4 and FIG. 5 are schematic diagram of deformation of an electrically drive piece provided in an embodiment of this invention without applying a voltage.
Figure 5:
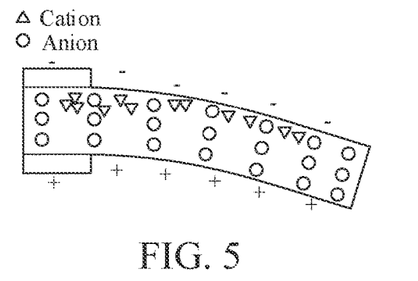

As shown in FIG. 4 and FIG. 5, when applying a voltage to the IPMC in a thickness direction, hydrated cations in the polymer electrolyte would move to a cathode side, causing a difference between swelling of an anode surface and a cathode surface of the IPMC, rendering deformation and bending to the anode surface. In this way, the bending degree of the IPMC can be controlled by controlling a powering voltage or current of the IPMC, so that the IPMC can be displaced in a transverse direction.

The IPMC material is a novel drive material, which has advantages of light drive weight, large displacement deformation generated, and low drive voltage. The advantages of using IPMC in the drive apparatus are obvious. For example, the IPMC is a non-magnetic material, which would not produce magnetic interference. The displacement and velocity generated by IPMC deformation decrease proportionally to the thickness of the IPMC, and a force generated by the IPMC deformation increases proportionally to a cube of the thickness of the IPMC. Therefore, the thickness of the IPMC can be set according to an actual situation to achieve the required displacement, velocity, and force degree generated by the IPMC deformation.

Furthermore, in a case that a voltage applied to the ion conduction drive piece is a first voltage, the ion conduction drive piece drives the carrier 2 to move along a first direction; in a case that a voltage applied to the ion conduction drive piece is a second voltage, the ion conduction drive piece drives the carrier 2 to move along a second direction; where polarities of the first voltage and the second voltage are opposite, and the first direction and the second direction are opposite to each other. Applying a voltage with an opposite polarity to the ion conduction drive piece can enable the ion conduction drive piece to drive the carrier 2 to move along the first direction or the second direction. The first direction and the second direction are both the axial direction of the second through hole 21.

Furthermore, in a case that a voltage applied to the ion conduction drive piece is the first voltage, the ion conduction drive piece drives the carrier 2 to move along a first direction by a first distance; in a case that a voltage applied to the ion conduction drive piece is a third voltage, the ion conduction drive piece drives the carrier 2 to move along the first direction by a second distance; where polarities of the first voltage and the third voltage are the same, the third voltage is greater than the first voltage, and the first distance is different from the second distance. The second distance may be greater than the first distance. When the carrier 2 is required to move a relatively large distance, the carrier 2 can be driven to move a relatively large distance by applying a relatively large voltage to the ion conduction drive piece. When the carrier 2 is required to move a relatively small distance, the carrier 2 can be driven to move a relatively small distance by applying a relatively large voltage to the ion conduction drive piece. There is a correspondence between the size of the voltage applied to the ion conduction drive piece and a moving distance of the carrier 2. In the case of determining the moving distance required for the carrier 2, the size of the voltage applied to the ion conduction drive piece can be determined according to the correspondence.

Furthermore, in a case that a voltage applied to the ion conduction drive piece is the first voltage, the ion conduction drive piece drives the carrier 2 to move along the first direction at a first speed; in a case that a voltage applied to the ion conduction drive piece is a third voltage, the ion conduction drive piece drives the carrier 2 to move along the first direction at a second speed; where polarities of the first voltage and the third voltage are the same, the third voltage is greater than the first voltage, the first speed is different from the second speed, and the second speed may be less than the first speed. When the carrier 2 is required to move at a relatively large speed, the carrier 2 can be driven to move at a relatively speed by applying a relatively large voltage to the ion conduction drive piece. When the carrier 2 is required to move at a relatively small speed, the carrier 2 can be driven to move at a relatively small speed by applying a relatively small voltage to the ion conduction drive piece. There is a correspondence between the size of the voltage applied to the ion conduction drive piece and a moving speed of the carrier 2. In the case of determining the moving speed required for the carrier 2, the size of the voltage applied to the ion conduction drive piece can be determined according to the correspondence.

In an embodiment of this application, a camera module is also provided, and includes a first drive apparatus, the first drive apparatus is the drive apparatus in the embodiment above.

Furthermore, a function device carried by a carrier in the first drive apparatus is a first lens or a first lens group, the camera module further includes a second drive apparatus, the second drive apparatus is the drive apparatus in the foregoing embodiments, and a function device carried by a carrier in the second drive apparatus is a second lens or a second lens group.

Figure 6:
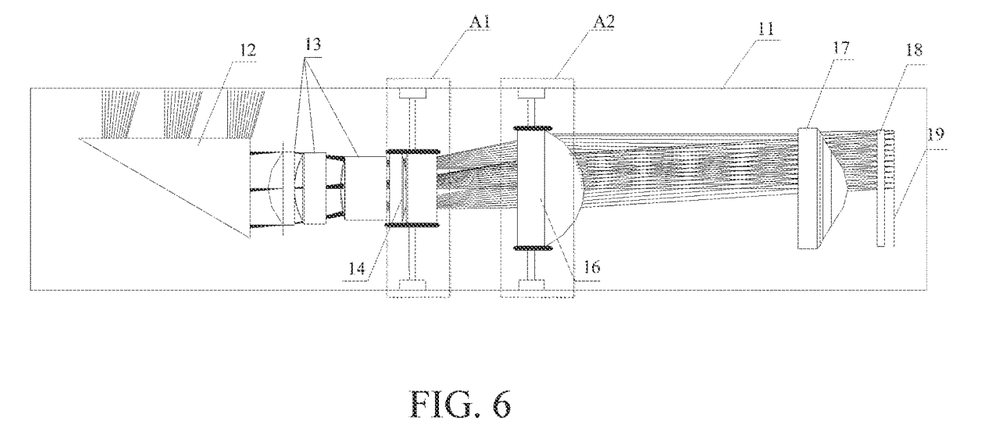
FIG. 6 is a schematic structural diagram of a camera module provided by an embodiment of this application.

FIG. 6 is a schematic structural diagram of a camera module provided by an embodiment of this application. As shown in FIG. 6, the reference numeral 11 shows a module outer casing, including alloys, which has a high strength, and can play a role in encapsulation and protection of module internal assemblies.

The reference numeral 12 shows a prism, made of a glass material. A prism slope can fully reflect an incoming light and change an optical path of an incident light. Therefore, a placement mode of the camera module on a mobile terminal (for example, a mobile phone) can be changed to break through limitation of the thickness and size of the mobile terminal. Since the prism can rotate, it can also play a role in preventing shaking in the module.

The reference numeral 13 shows a front fixed group including three aspherical lenses, which has the function of gathering and receiving light.

Figure 7:
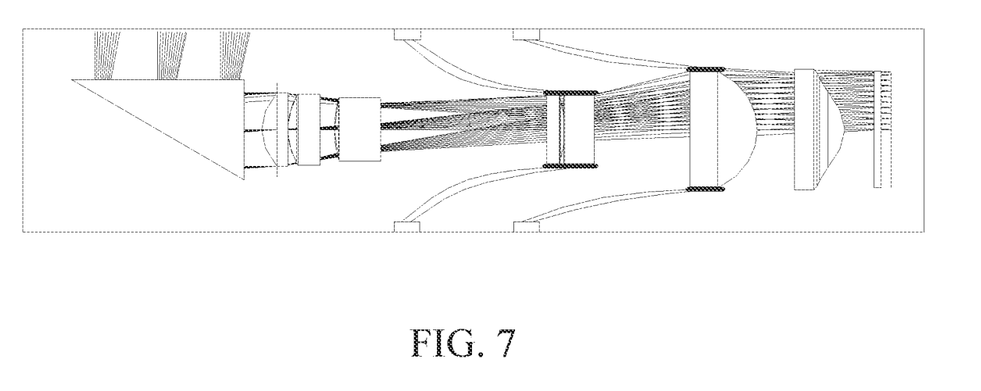
FIG. 7 is a schematic diagram of a camera module zooming effect provided by an embodiment of this application.

The reference numeral A1 is the first drive apparatus, and the reference numeral A2 is the second drive apparatus, where the reference numeral 14 is a zoom lens group, that is, the function device carried by the carrier of the first drive apparatus A1. The zoom lens group is composed of two aspherical lenses; a voltage is applied to the electrically drive assembly of the first drive apparatus A1, and the electrically drive assembly generates deformation to drive the carrier to move, so as to change the focal length of the lens and increase the zooming ratio, as the effect diagram of the electrically drive assembly of the first drive apparatus A1 pushing the carrier to move shown in FIG. 7.

The compensating lens group is shown in the reference numeral 16, that is, the function device carried by the carrier of the second drive apparatus A2. The compensating lens group includes an aspherical lens, which can be made of plastic or glass. A voltage is applied to the electrically drive assembly of the second drive apparatus A2, and the electrically drive assembly generates deformation to drive the carrier to move, so as to compensate for image surface movement caused by the movement of the zoom lens group 14, as the effect diagram of the electrically drive assembly of the second drive apparatus A2 pushing the carrier to move shown in FIG. 7.

The reference numeral 17 shows a rear fixed group including an aspherical lens, which has the function of gathering a scene of an object side into a real image of a system.

The color filter is shown in the reference numeral 18 and is a glass plate coated with an infrared cutoff film, which can filter out an infrared light entering the system.

The photosensitive chip is shown in the reference numeral 19 and has a photoelectric conversion function to convert an optical signal after aberration correction into an electrical signal.

The fixed assembly of the first drive apparatus A1 can be fixedly disposed on an outer casing 11 of the module, and a limit structure or guide structure can also be set on the outer casing 11 of the module. The fixed assembly of the first drive apparatus A1 can be set on the limit structure or guide structure. The fixed assembly of the first drive apparatus A1 is limited to a predetermined position or limited to move in a predetermined direction through the limit structure or guide structure.

Similarly, the fixed assembly of the second drive apparatus A2 can also be set on the limit structure or guide structure.

Through continuous movements of the zoom lens group and the compensating lens group, when the zoom lens group and the compensating lens group are located in different positions, they respectively correspond to different focal lengths. Since the IPMC can achieve large displacement, so that the zooming ratio of the camera module is very high. This solution of deforming the IPMC when a voltage is applied and driving the movements of the zoom lens group and compensating lens group of the camera can realize continuous optical zooming. The drive apparatus provided in this application has advantages of simple structure, no magnetic interference, large stroke, and large zooming ratio.

In an embodiment of this application, an electronic device is also provided, and the first drive apparatus in the embodiment above.

The above-mentioned contents are merely specific implementations of the disclosure; however, the protection scope of the disclosure is not limited thereto. Any change or replacement that could be easily conceived of by a person skilled in the technical field in the technical scope disclosed in the disclosure should be covered in the protection scope of the disclosure. Therefore, the protection scope of this application shall be subject to the protection scopes of the claims.

What is claimed is:

1. A drive apparatus, comprising a fixed assembly, a carrier, and an electrically driven assembly;
    wherein a first end of the electrically driven assembly is connected to the fixed assembly, and a second end of the electrically driven assembly is connected to the carrier; and
    the carrier is used for carrying a function device; and
    wherein in a case of applying a voltage to the electrically driven assembly, the electrically driven assembly deforms to drive the carrier to move;
    wherein the electrically driven assembly comprises electrically drive pieces, first ends of the electrically drive pieces are connected to the fixed assembly, and second ends of the electrically drive pieces are connected to the carrier;
    wherein the fixed assembly comprises an annular structure member with a first through hole, the carrier is disposed in the first through hole, there are a plurality of electrically drive pieces, and the plurality of electrically drive pieces are symmetrically disposed with respect to a central axis of the first through hole;
    wherein the drive apparatus comprises a housing, wherein the annular structure member is fixedly disposed at the housing, the fixed assembly further comprises a fixed member, the fixed member is disposed at an inner wall of the first through hole, and the number of the fixed members is the same as the number of the electrically drive pieces, and each of the electrically drive pieces is connected to the annular structure member through one of the fixed members;
    wherein the fixed member comprises an upper gasket and a lower gasket, and the upper gasket and the lower gasket are respectively in contact with a first surface and a second surface of the electrically drive piece;
    wherein the drive apparatus further comprises a circuit board, wherein the circuit board is disposed at a gap between the housing and the annular structure member, and the fixed member is electrically connected to the circuit board, and wherein in a case that the fixed member is electrically conducted with the circuit board, polarity of voltages applied to the upper gasket and the lower gasket is opposite, so that polarity of voltages applied to the first surface and the second surface of the electrically drive piece is opposite, so as to deform the electrically drive piece to drive the carrier to move.

2. The drive apparatus according to claim 1, wherein the carrier comprises a second through hole, the second through hole forms an accommodating cavity, and the function device is disposed in the accommodating cavity; and in a case of applying a voltage to the electrically drive piece, the electrically drive piece deforms and drives the carrier to move along an axial direction of the second through hole.

3. The drive apparatus according to claim 1, wherein the electrically drive piece is an ion conduction drive piece, the ion conduction drive piece comprises an ion exchange resin layer and a first electrode layer and a second electrode layer respectively disposed at two opposite surfaces of the ion exchange resin layer, and a polymer electrolyte is disposed in the ion exchange resin layer.

4. The drive apparatus according to claim 3, wherein in a case that a voltage applied to the ion conduction drive piece is a first voltage, the ion conduction drive piece drives the carrier to move along a first direction; and in a case that a voltage applied to the ion conduction drive piece is a second voltage, the ion conduction drive piece drives the carrier to move along a second direction; and wherein polarities of the first voltage and the second voltage are opposite, and the first direction and the second direction are opposite to each other.

5. The drive apparatus according to claim 3, wherein in a case that a voltage applied to the ion conduction drive piece is a first voltage, the ion conduction drive piece drives the carrier to move along a first direction by a first distance; and in a case that a voltage applied to the ion conduction drive piece is a third voltage, the ion conduction drive piece drives the carrier to move along the first direction by a second distance; and wherein polarities of the first voltage and the third voltage are the same, the third voltage is greater than the first voltage, and the first distance is different from the second distance.

6. The drive apparatus according to claim 3, wherein in a case that a voltage applied to the ion conduction drive piece is a first voltage, the ion conduction drive piece drives the carrier to move along a first direction at a first speed; and in a case that a voltage applied to the ion conduction drive piece is a third voltage, the ion conduction drive piece drives the carrier to move along the first direction at a second speed; and wherein polarities of the first voltage and the third voltage are the same, the third voltage is greater than the first voltage, and the first speed is different from the second speed.

7. A camera module, comprising a first drive apparatus, wherein the first drive apparatus comprises a fixed assembly, a carrier, and an electrically driven assembly;

wherein a first end of the electrically driven assembly is connected to the fixed assembly, and a second end of the electrically driven assembly is connected to the carrier; and the carrier is used for carrying a function device; and wherein in a case of applying a voltage to the electrically driven assembly, the electrically driven assembly deforms to drive the carrier to move;

wherein the electrically driven assembly comprises electrically drive pieces, first ends of the electrically drive pieces are connected to the fixed assembly, and second ends of the electrically drive pieces are connected to the carrier;

wherein the fixed assembly comprises an annular structure member with a first through hole, the carrier is disposed in the first through hole, there are a plurality of electrically drive pieces, and the plurality of electrically drive pieces are symmetrically disposed with respect to a central axis of the first through hole;

wherein the drive apparatus comprises a housing, wherein the annular structure member is fixedly disposed at the housing, the fixed assembly further comprises a fixed member, the fixed member is disposed at an inner wall of the first through hole, and the number of the fixed members is the same as the number of the electrically drive pieces, and each of the electrically drive pieces is connected to the annular structure member through one of the fixed members;

wherein the fixed member comprises an upper gasket and a lower gasket, and the upper gasket and the lower gasket are respectively in contact with a first surface and a second surface of the electrically drive piece;

wherein the drive apparatus further comprises a circuit board, wherein the circuit board is disposed at a gap between the housing and the annular structure member, and the fixed member is electrically connected to the circuit board, and wherein in a case that the fixed member is electrically conducted with the circuit board, polarity of voltages applied to the upper gasket and the lower gasket is opposite, so that polarity of voltages applied to the first surface and the second surface of the electrically drive piece is opposite, so as to deform the electrically drive piece to drive the carrier to move.

8. The camera module according to claim 7, wherein a function device carried by a carrier in the first drive apparatus is a first lens or a first lens group, the camera module further comprises a second drive apparatus, wherein the second drive apparatus comprises a fixed assembly, a carrier, and an electrically driven assembly;

wherein a first end of the electrically driven assembly is connected to the fixed assembly, and a second end of the electrically driven assembly is connected to the carrier; and the carrier is used for carrying a function device; and wherein in a case of applying a voltage to the electrically driven assembly, the electrically driven assembly deforms to drive the carrier to move;

and a function device carried by a carrier in the second drive apparatus is a second lens or a second lens group.

9. The camera module according to claim 8, wherein the first lens or the first lens group is a zoom lens group, and the zoom lens group comprises two aspherical lenses; and in a case of applying a voltage to an electrically driven assembly of the first drive apparatus, the electrically driven assembly generates deformation to drive the carrier in the first drive apparatus to move, so as to move the zoom lens group.

10. The camera module according to claim 8, wherein the second lens or the second lens group is a compensating lens group, and the compensating lens group comprises an aspherical lens; and in a case of applying a voltage to an electrically driven assembly of the second drive apparatus, the electrically driven assembly generates deformation to drive the carrier in the second drive apparatus to move, so as to move the compensating lens group, to compensate for image surface movement caused by the movement of the zoom lens group.

11. The camera module according to claim 8, further comprising a prism, wherein the prism is disposed in front of the first lens or the first lens group on an optical path of the camera module.

12. The camera module according to claim 8, further comprising a rear fixed group, wherein the rear fixed group is disposed behind the second lens or the second lens group on the optical path.

13. The camera module according to claim 8, further comprising a color filter, wherein the color filter is disposed behind the rear fixed group on the optical path.

14. The camera module according to claim 8, further comprising a photosensitive chip, wherein the photosensitive chip is disposed behind the color filter on the optical path.

15. An electronic device, comprising a drive apparatus,
wherein the drive apparatus comprises a fixed assembly, a carrier, and an electrically driven assembly;
wherein a first end of the electrically driven assembly is connected to the fixed assembly, and a second end of the electrically driven assembly is connected to the carrier; and
the carrier is used for carrying a function device; and
wherein in a case of applying a voltage to the electrically driven assembly, the electrically driven assembly deforms to drive the carrier to move;
wherein the electrically driven assembly comprises electrically drive pieces, first ends of the electrically drive pieces are connected to the fixed assembly, and second ends of the electrically drive pieces are connected to the carrier;
wherein the fixed assembly comprises an annular structure member with a first through hole, the carrier is disposed in the first through hole, there are a plurality of electrically drive pieces, and the plurality of electrically drive pieces are symmetrically disposed with respect to a central axis of the first through hole;
wherein the drive apparatus comprises a housing, wherein the annular structure member is fixedly disposed at the housing, the fixed assembly further comprises a fixed member, the fixed member is disposed at an inner wall of the first through hole, and the number of the fixed members is the same as the number of the electrically drive pieces, and each of the electrically drive pieces is connected to the annular structure member through one of the fixed members;
wherein the fixed member comprises an upper gasket and a lower gasket, and the upper gasket and the lower gasket are respectively in contact with a first surface and a second surface of the electrically drive piece;
wherein the drive apparatus further comprises a circuit board, wherein the circuit board is disposed at a gap between the housing and the annular structure member, and the fixed member is electrically connected to the circuit board, and wherein in a case that the fixed member is electrically conducted with the circuit board, polarity of voltages applied to the upper gasket and the lower gasket is opposite, so that polarity of voltages applied to the first surface and the second surface of the electrically drive piece is opposite, so as to deform the electrically drive piece to drive the carrier to move.

* * * * *